United States Patent
Grote-Hahn et al.

(10) Patent No.: US 8,433,329 B2
(45) Date of Patent: Apr. 30, 2013

(54) SYSTEM AND METHOD FOR PRIORITIZING USER COMMUNICATIONS

(75) Inventors: Walter Uwe Grote-Hahn, Vina Del Mar (CL); Mayra Soledad González-Canedo, Valparaiso (CL)

(73) Assignee: Universidad Tecnica Federico Santa Maria, Valparaiso (CL)

( * ) Notice: Subject to any disclaimer, the term of this patent is extended or adjusted under 35 U.S.C. 154(b) by 344 days.

(21) Appl. No.: 12/981,450

(22) Filed: Dec. 29, 2010

(65) Prior Publication Data
US 2012/0003959 A1    Jan. 5, 2012

(51) Int. Cl.
*H04W 36/00* (2009.01)
*H04W 40/00* (2009.01)
*H04W 72/00* (2009.01)
*H04B 7/00* (2006.01)
*G01R 31/08* (2006.01)
*H04L 12/28* (2006.01)
*H04J 3/16* (2006.01)
*H04M 15/00* (2006.01)

(52) U.S. Cl.
USPC ........... 455/450; 455/436; 455/442; 455/445; 455/453; 455/509; 370/230; 370/431; 370/437; 379/112.01; 379/112.03; 379/112.04

(58) Field of Classification Search .......... 455/436–453, 455/463–464, 509–512; 370/230–234, 431, 370/437; 379/112.01, 112.03, 112.04, 112.05
See application file for complete search history.

(56) References Cited

U.S. PATENT DOCUMENTS

| | | | | |
|---|---|---|---|---|
| 5,301,356 | A | * | 4/1994 | Bodin et al. .................. 455/436 |
| 5,497,504 | A | * | 3/1996 | Acampora et al. ............ 455/436 |
| 6,484,145 | B1 | * | 11/2002 | Horne et al. .................. 705/7.25 |
| 6,760,594 | B1 | * | 7/2004 | Murasawa et al. ............ 455/512 |
| 7,006,831 | B2 | | 2/2006 | Matz et al. |
| 7,660,244 | B2 | * | 2/2010 | Kadaba et al. ............... 370/230 |
| 2006/0135117 | A1 | | 6/2006 | Laumen et al. |
| 2006/0285490 | A1 | * | 12/2006 | Kadaba et al. ............... 370/230 |
| 2007/0105563 | A1 | * | 5/2007 | Ro et al. ..................... 455/452.2 |

OTHER PUBLICATIONS

T. C. Wong, et al. "Resource Allocation in Mobile Cellular Networks with QoS Constraints," Centre for Wireless Communications National University of Singapore, Singapore; University of Waterloo, Waterloo, Ontario, Canada; Department of Electrical and Computer Engineering, Nat. University of Singapore, Singapore; 2002 IEEE, pp. 717-722.

Ming Yang et al. "Capacity Optimizing Channel Allocation Scheme Supporting Multiple Services with Mobile Users in Cellular System," Network Technology Research Centre, Nanyang Technological University, Singapore; IEEE Globecom 2005, pp. 3836-3840.

(Continued)

*Primary Examiner* — Wesley Kim
(74) *Attorney, Agent, or Firm* — Karim Lagobi (57) ABSTRACT

The invention provides a method and system to quantify the impact of granting access privileges for voice channels in mobile cellular telecommunications when dealing with applications where such a policy may improve service quality regardless of the technology used by the service provider. The number of channels that need to be reserved in order to reach the target can be determined. Channel access requests are categorized according to a prioritization scheme providing several blocking probabilities according to the portion of subscribers belonging to each access service class, the total number of service channels in a cell sector, and the target blocking probability and total traffic (or load).

18 Claims, 3 Drawing Sheets

OTHER PUBLICATIONS

Shensheng Tang et al. "Performance Analysis of a Channel Allocation Scheme with Preemptive Priority for Integrated Voice/Data Mobile Networks," Department of Electrical Engineering and Computer Science, University of Toledo, Toledo Ohio, USA; 2005 IEEE; pp. 417-442.

* cited by examiner

SYSTEM AND METHOD FOR PRIORITIZING USER COMMUNICATIONS

FIELD OF THE INVENTION

The invention relates to connecting users to a telecommunication network; and particularly to a system and method for establishing priorities for connecting wireless user calls to a network.

A portion of the disclosure of this patent document contains material which is subject to copyright protection. The copyright owner has no objection to the facsimile reproduction by anyone of the patent document or the patent disclosure, as it appears in the Patent and Trademark Office file or records, but otherwise reserves all copyrights associated with this document.

BACKGROUND OF THE INVENTION

Present day wireless communication utilizes radio waves as a carrier to transmit voice and/or data. Digitized voice and multimedia data is used to modulate radio frequency (RF) channels that carry the signals from a mobile device, for example, to a base station. Typically, both the base station and the mobile terminal use a limited amount of power to transmit the signal, which results in covering only a limited geographical area. Thus, outside the geographical area of coverage, frequency channels may be reused. The basic management unit for access to cellular services is the area covered by a base station—the cell—can be divided into sectors to reduce interference between adjacent cells. Because of the limited number of service channels that can be accessed in a given area covered by a base station, the number of simultaneous communications that can be carried out in a given coverage area is also limited.

When the number of service requirements for voice or data exchange within a coverage area exceeds the number of channels available, any new service request must be rejected, which is known as a blocked call. Under these conditions it is said that the network is in a state of congestion. The percentage of calls that are blocked is defined as the grade of service. Thus, a 2% grade of service means that two (2) out of one hundred (100) calls will be blocked and their service request cannot be handled at any given time, on the average. Service providers try to keep the number of rejected service requests reasonable and within regulation guidelines. To establish the grade of service, network administrators rely on performance curves and equivalent tables generated by mathematical models, among which the best-known being the Erlang B and Erlang C models. The latter models define the probability that a request for voice communication service will be granted, rejected, or delayed.

In the case of a moving mobile device, such as a mobile phone, calls in progress on mobile phones on the edge of a cell sector's service area must be transferred to a neighboring base station, in order to maintain service. The latter is achieved by seamlessly transitioning from a weak signal from a base station to a stronger signal from a next (closer) base station. This process is called handover (HO). The handover is possible only if the neighboring cell sector has a channel available for this purpose. Otherwise, the call will be dropped.

Service providers tend to avoid dropping calls because it is more annoying for subscribers than being unable to initiate a new call. The latter condition creates two service access priority levels: handover level and new call level, with handover requests having a higher priority than new call requests. To ensure there are enough channels available to support handover requests at times of congestion, a predetermined number of channels in a cell sector are reserved for that purpose. This means that the probability of accepting a handover request is much greater than the probability of allowing a new call request. Therefore, a new call initiated within the cell sector will be rejected if the only channels available are the ones reserved for handovers.

Existing methods, such as Erlang B and C mathematical models, do not consider priority access. Mobile network administrators of existing systems rely on their own professional experience in order to reserve channels for handovers.

Some prior art technologies attempt to address the issue of managing wireless connections in order to optimize the efficiency of the wireless networks. In "Performance Analysis of a Channel Allocation Scheme with Preemptive Priority for Integrated Voice/Data Mobile Networks", published in the 24th IEEE International Performance, Computing, and Communications Conference, 2005, (IPCCC 2005), S. Tang and W. Li, present an analytical model that dynamically adjusts three categories of channels to two service levels of voice and data traffic. Data calls may be dropped in case voice calls are transferred in from an adjacent cell sector, and no channels are available. The publication provides some curves to establish blocking probabilities for both services as a function of the total traffic load and the number of channels.

In "Capacity Optimizing Channel Allocation Scheme Supporting Multiple Services with Mobile Users in Cellular System" published in IEEE GLOBECOM 2005 Proceedings, M. Yang and P. H. J. Chong study the performance of a channel assignment (Channel Partitioning: CP) to support two levels of services (voice and data) with different reuse and signal interference factors for mobile users in a cellular system. They also provide blocking probabilities for each type of service.

U.S. Pat. No. 6,484,145 B1, entitled "Priority Access Channel Reservation" by S. L. Home C. Chern, published Nov. 19, 2002, presents a priority channel allocation method, limiting the amount of available channels to maintain a constant blocking probability. This method requires setting up a targeted blocking rate to the first priority level, using the Erlang B model to start the system. Then this blocking rate is dynamically adjusted. The problem with this procedure is that it requires constant monitoring of dynamic traffic statistics to ensure that constant blocking probability is maintained for the higher priority service class. This implies a use of computational resources that compromises overall network performance. Another problem is that the Erlang B model does not represent the initial situation well, resulting in settings that need adjustment.

The U.S. Pat. No. 7,006,831 "Apparatus and Method for Providing Dynamic Network Traffic Control Communications," by W. R. Matz, D. R. O'Neil, J. R. Bacon and V. Meadows, published Feb. 28, 2006, presents a method of prioritized active or passive channel allocation to be implemented in geographical locations that experience high-traffic periods. Active monitoring is done by blocking, delaying, or cutting off calls in the system, whereas the passive control gives the user the option (preferably via SMS) to select a higher priority service to make the call for an additional fee. This invention describes the technical and business aspects involved in providing a priority channel assignment.

The U.S. Pat. No. 6,760,594 B1, "Method of Connecting Priority Call in Wireless Communication System and Apparatus for Achieving Method" by S. Murasawa and R. Ishibashi, published Jul. 6, 2004, presents a method for establishing priority calls using physical constraints and software thresholds in CDMA systems. Note that priority calls, as considered in this patent, are for emergency situation applications.

The publication U.S. 2006135117 A1, of Jun. 22, 2006, entitled "Method for providing paying services, user identification device, and device for providing said services" by J. Laumen, A. Schmidt, and S. Van Niekerk, describes a payment method for services of a GSM communications network. This method for exchanging messages between the user and service provider can be used to negotiate access privileges for users that do not have them. A radio communications terminal with a user identification device and a device for payment services is provided.

There is a need for a method and system that allows for establishing connection to a telecommunication network based on access privileges assigned to users.

SUMMARY OF THE INVENTION

The invention provides a system and method that improves the efficiency of service in cellular mobile communications. The system allows for granting access privileges to users in a multilevel scale, and manages the access to the network based on the access level contracted by the users. The latter is achieved by granting privileged access to mobile telecommunications services, optimizing the allocation of channels within a cell in such a way that users may experience fair blocking probabilities, based upon the decisions that the service provider takes using performance tables or curves. Because it is necessary to quantify the impact of prioritized access on voice channels for all users, the invention provides a method to predict blocking probabilities by means of performance curves or tables associated with the effect that a fraction of channels may be reserved for privileged access. In this context, privilege of access means that the service provider is more likely to honor the request for telephone service, for example, of one mobile user that belongs to a higher priority class than it may do for a user that is part of a lower priority class.

The invention offers a method to assess the impact of such a policy on the blocking probability of each of these service classes, given total traffic load, portion of calls that have these privileges, and the number of channels.

Prior art, cited above, does not provide a method of establishing the impact on users and service providers of implementing policies of priority access to different classes of voice calls either in a fixed way or dynamically, which may carried out, for example, in the case of need for emergency services. Another example is that, after an exchange of messages, a low priority class subscriber may either accept or reject the service provider's offer to grant access (while charging a fee for priority service) in a congested network.

Among the advantages of the invention over prior art, is a method to determine the impact on blocking probabilities for allocating voice channel access privileges for different users, depending on the expected traffic load, the fraction of terminals with access privileges, and the total number of channels available in a service area.

An implementation of the invention takes into account the total traffic (or load) offered in a cell sector and the expected fraction of calls that can be associated to each type of access service. Also, the total number of channels available and the number of channels that will be accessible to each type of access service are taken into account. Furthermore, it is assumed that all channels are accessible to handover (HO: Handoff or Handover) calls, that high priority class of calls (CP: Privileged) have a slightly more restricted access than handover calls—that is, that when all channels, except a few ones, are busy, the call of this class will be dropped—and a third class (SP: no privileges) that has access to even less channels than the high priority calls. The number of channels accessible to each class will be determined precisely as a function of the desired blocking probability for each type of access service class.

The priorities of access service described can be established for various reasons. In the case of HO the reason is simple: calls in progress should be transferred from a cell sector to another to improve signal reception because customers do not like it to have their phone calls suddenly interrupted. A dropped call is considered by most users of mobile telephony a bad service. In other situations, priority may be based on the urgency of the call. For example, calls to agencies that deal with emergency situations should have network access privileges (calls to the fire brigade, hospital emergency departments, emergency citizens services calls, etc.), especially following a catastrophic event. Implementations of the invention enable service providers to implement business plans that allow users network access at higher priority level for a fee.

DETAILED DESCRIPTION OF THE INVENTION

The invention provides a system and method for allowing access to a telecommunication network using privileges based on access privilege level. The invention utilizes existing data that characterize the network, such as current load, expected traffic as well user's access level in order to determine the priority of a particular call request to connect to the network.

In the following description, numerous specific details are set forth to provide a more thorough description of the invention. It will be apparent, however, to one skilled in the pertinent art, that the invention may be practiced without these specific details. In other instances, well known features have not been described in detail so as not to obscure the invention. The claims following this description are what define the metes and bounds of the invention.

For illustration, in the following description the implementation is described as having three types of access service. However, one with ordinary skills in the art of telecommunication would recognize that the invention may be implemented with any number of additional types of access privileges, and may be implemented in numerous telecommunication systems without departing from the concepts disclosed herein.

In the following description, embodiments of the invention are described as concerned with wireless phone calls. However, one with ordinary skills in the art would recognize that the invention can be practiced in numerous implementations that serve transmission of text data, video and audio data either separately or mixed together, for example, to serve video conferencing communications, still image data and any other type of data that may be transmitted using an embodiment of the invention. Therefore, a reference to "call" may mean an ongoing communication session, and in other instances it may mean a request for establishing a communication connection.

A reference to "user" in the disclosure may refer to a person using a system embodying the invention and/or a machine that carries out a communication either on behalf of a person or automatically following a programmed set of steps to provide a communication service. For example, a machine located remotely may use a system embodying the invention to communicate with another machine in order to transmit (and/or download) data.

Figure 1:
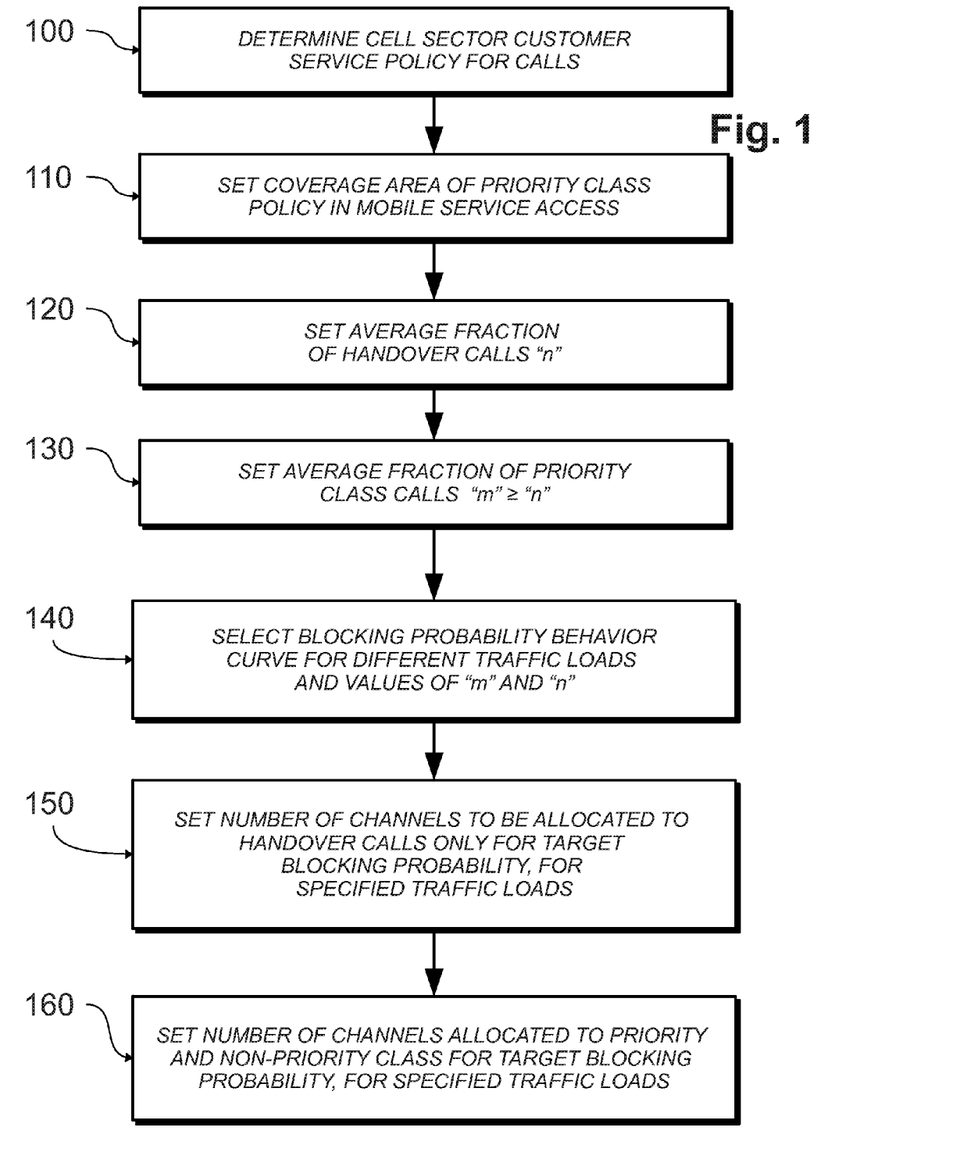
FIG. 1 is a flowchart diagram representing method steps involved in sizing a cellular network system and prioritizing user access based on a scheme of privilege level in accordance with an embodiment of the invention.

FIG. 1 is a flowchart diagram representing method steps involved in sizing a cellular network system and prioritizing user access based on a scheme of privilege level in accordance with an embodiment of the invention. A system implementing the invention, such as a telecommunication network of a service provider, enables the service provider to decide whether to implement access privileges for customer service calls at the cell sector level, or if privileged access may be applied. If privileged access is not to be established, the service quality may still be estimated according to traditional methods, i.e. Erlang B and Erlang C. At step 100, a system implementing the invention is enabled to select whether to use the multi-level privilege system provided by the invention.

In case that the use of several access privileges is selected, at step 110, the service provider may decide the coverage area of this policy. The latter step involves setting up the coverage area of priority class policy in mobile service access, which may extend nationwide, region wide, city wide or even to a specific cell sector at step 110. At step 120, the portion of total traffic in the cell that is caused by a transfer "n" (Handoff, transfer of a call), and the portion of total calls expected with priority access (identified by the letter "m") are established, where n<m<1. The fraction of handover calls "n" may be established based on historical records or by an estimate of the conditions specific to a particular cell sector or fixed wireless service coverage area, which may include a sector, city, region or country or any other information pertinent to estimating network traffic.

At step 130, the portion of calls that have access privileges "m" in a sector, city, region or country may be estimated based on the fraction of mobile devices that have been given these privileges for the intended coverage area by the service provider. With the latter information, the performance curve (or table of values) appropriate for selected values of "n" and "m" may be selected at step 140.

For example, following the above steps, the portion of transfer calls may be set to n=15%, (e.g., at step 120) and the portion of the total calls with priority access may be set to m=35%, so that m+n=50%, (130). Once these values have been recognized, the appropriate performance curves (or table) are selected. The curves are generated using an analytical model based on queuing theory and/or on service call simulations. The latter data establishes the blocking probabilities in relation to the total traffic or load and the number of channels from which calls of each class may be blocked, (e.g., at step 140). The latter case is shown in FIG. 2, where a cell operates with 31 voice channels plus a control channel, and where the voice channels are the only ones to which the procedure here is applied.

At step 150, a system implementing the invention may set the number of channels to be allocated to handover calls only for target blocking probability, for specified traffic loads.

At step 160, a system implementing the invention may set the number of channels allocated to priority and non-priority class for target blocking probability, for specified traffic loads.

Figure 2:
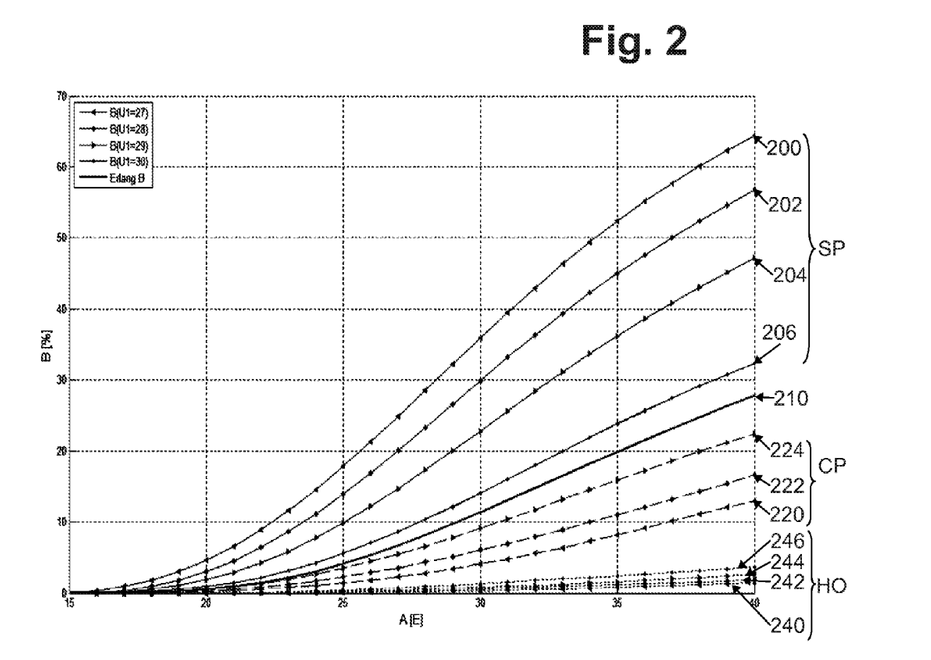
FIG. 2 shows performance data plots representing examples of call blocking probability for each service class as a function of the total load offered and the channel number thresholds for each service type.

FIG. 2 shows performance data plots representing examples of call blocking probability for each service class as a function of the total load offered and the channel number thresholds for each service type. In the latter particular case, parameters (n=0.15 and m+n=0.5) were selected. Loads represented in FIG. 2 range from 15 to 40 Erlang. Curve 210 is the well known Erlang B blocking probability curve for 31 channels, where no access privileges have been considered. The other blocking probability performance curves are a function of the channel number threshold. FIG. 2 has been constructed for a situation where 31 channels are available for HO, 30 (U2=30) are available for high priority calls and low priority calls may access only 27, 28, 29 or 30 channels (U1=27, 28, 29 or 30). If, for instance, it is chosen that U1=27, then, for a load of 35 E the expected blocking probability for low priority users would be approximately 52% (curve 200), for high priority users it would be 8% (curve 220) and for HO it would be 1% (curve 240). The example chosen has considered an unusual large traffic load in order to illustrate the procedure with clearly distinctive readings form FIG. 2. Normally, cell sectors are designed for a busy hour traffic load of 21 E. With data like the one provided from FIG. 2, the set of channels to be allocated to handover, priority and non-priority calls for target blocking probability and specified traffic loads can be established, as specified in (150) and (160), respectively, of FIG. 1.

The values of FIG. 2 are presented as plots for easy viewing, however, a system embodying the invention may generate lookup tables having similar values. Additionally, a plurality of tables may be generated by inserting a set of parameters in mathematical relationships derived from a queuing model, or by a simulation program modeling the random occurrence of calls of random duration.

The embodiment is based on the following assumptions: the service provider is interested in establishing a service with access privileges, privileges for call transfer, and two access privilege classes for calls made in a cell sector, one with and one without access privileges.

In the example provided in FIG. 2, the portion of handover calls is set at n=15% (equivalent to n=0.15), and the expected portion of the total calls with priority access m+n=50% (or m+n=0.5). It is assumed that the load offered to 31 voice channels is in a range of A=(15, 40) Erlang. However, and continuing with the example, the blocking probabilities of a call with a load of 25 Erlang are established. The activation thresholds of the call rejection policies must be specified according to the priority classes being considered. In this case, a reserve channel is dedicated to transfer calls when the network is congested (U2=30), and when the number of rejected non-priority calls is U1=27 to 31.

The above quantities are sufficient to develop a table of values or equivalent performance curves through analytical and simulation models, such as those shown in FIG. 2, which have been included for this example. For values other than "m", "n" and the total number of channels, tables or figures with performance curves similar to those in FIG. 2 can be created from mathematical or simulation models. In the context of this invention, not every possibility has been included because they pertain to a very broad spectrum and are not all necessary to demonstrate the method.

With FIG. 2, whose performance curves (or table) are based on predefined parameters, a total load and threshold can be established. In FIG. 2 the ordinate axis indicates the probability of call rejects for a determined value of the total average traffic at the time loaded, given by the abscissa axis. With this information, the number of channels dedicated exclusively to managing transfer calls (Handoff or Handover) from neighboring sectors during times of congestion can be determined (150). In this case it has been chosen as U2=30, except, of course in the case of the Erlang B curve, for which U2=U1=31. In addition, the number of U1 channels from which non-privileged calls will be rejected must be chosen (160). In FIG. 2, if U1=27, then the blocking probability performance curve for low priority voice calls (SP) is 200, for high priority (CP) it is 220 and for Handoff it is 240.

It can be noted that the blocking probabilities for SP terminals are always greater than those with access privileges (CP). Specifically, the performance curves allow the grade of service of each of the classes for different load conditions (total traffic) to be predicted, considering the previously stated conditions.

In FIG. 2, three other cases are presented, corresponding to the threshold values when U1=28, 29, 30, and U2=30. For completeness, the Erlang B curve has also been included, for which U1=U2=31. Below, the performance curves of each case are presented.

U1=28, U2=30: the performance curve (202) represents the blocking probability of the non-priority mobile terminals (SP). The performance curve (222) indicates the blocking probability of the priority mobile terminals (CP), while the performance curve (242) denotes the same for the HO transfer calls.

U1=29, U2=30: the performance curve (204) represents the blocking probability of non-priority terminals (SP), while performance curve (224) denotes the blocking probability of the priority terminals (CP), and performance curve (244) indicates the blocking probability for the HO transfer calls.

U1=30, U2=30: performance curve (206) represents the blocking probability of priority (CP) and non-priority (SP) terminals, while performance curve (246) indicates the blocking probability of the HO transfer calls.

U1=31, U2=31: performance curve (210) represents the blocking probability of a group of 31 telephone channels, known as Erlang B, where there is no prioritization for grades of service.

As seen in FIG. 2, the three curves of each case are interdependent. By changing one of the two thresholds, the three performance curves are modified. For example, if the threshold U1 is increased, the value of the performance curves for the blocking probability of non-priority (SP) users decreases, thus obtaining a lower blocking probability. If instead, in this same situation, the blocking probability performance curves for priority users (CP) increases (because more channels are available for use for SP users), their blocking probabilities will be greater.

The practical application of curves like the ones of the example shown in FIG. 2—and on which the procedure developed in the invention is based on—is when a cellular service provider knows that approximately 50% of its clients have contracted non-priority service (SP) and the service provider has reserved any one of the thirty one available channels (U2=30) exclusively for transfers (HO) and a threshold of any five of the thirty one available channels (U1=27) that cannot be used by these SP clients in a given coverage area. When a load of 25 Erlang is registered, the SP clients experience a blocking probability of approximately 18% (performance curve 200), while those with CP (performance curve 220) have approximately a 2% blocking probability. HO calls (performance curve 240) will suffer practically no blocking.

Instead, if the service provider assigns any twenty nine of the thirty one available channels to handle non-priority calls (U1=29) and any one of the thirty one available channels exclusively for transfer calls in high traffic conditions (U2=30), the probability that calls of non-priority users will be blocked in the cell sector is approximately 10% (performance curve 204). Users with access privileges will experience a 5% probability of a new call request being rejected (performance curve 224), while call transfers have less than 1% grade of service (performance curve 244).

It is noted then that by applying the method described, it is possible for the cellular service provider to establish grades of service in accessing communication and voice resources. It is also possible to measure the impact that the types of priority access will have on subscribers, with regard to quality of service. The generation of these performance curves (or of the tables used to create the curves) is based on theoretical models based on queuing theory or simulation of random calls, whose duration is also random, to a server system, of which some only respond to preferential clients. These values can constitute a database or form part of a computer program calculation process.

Figure 3:
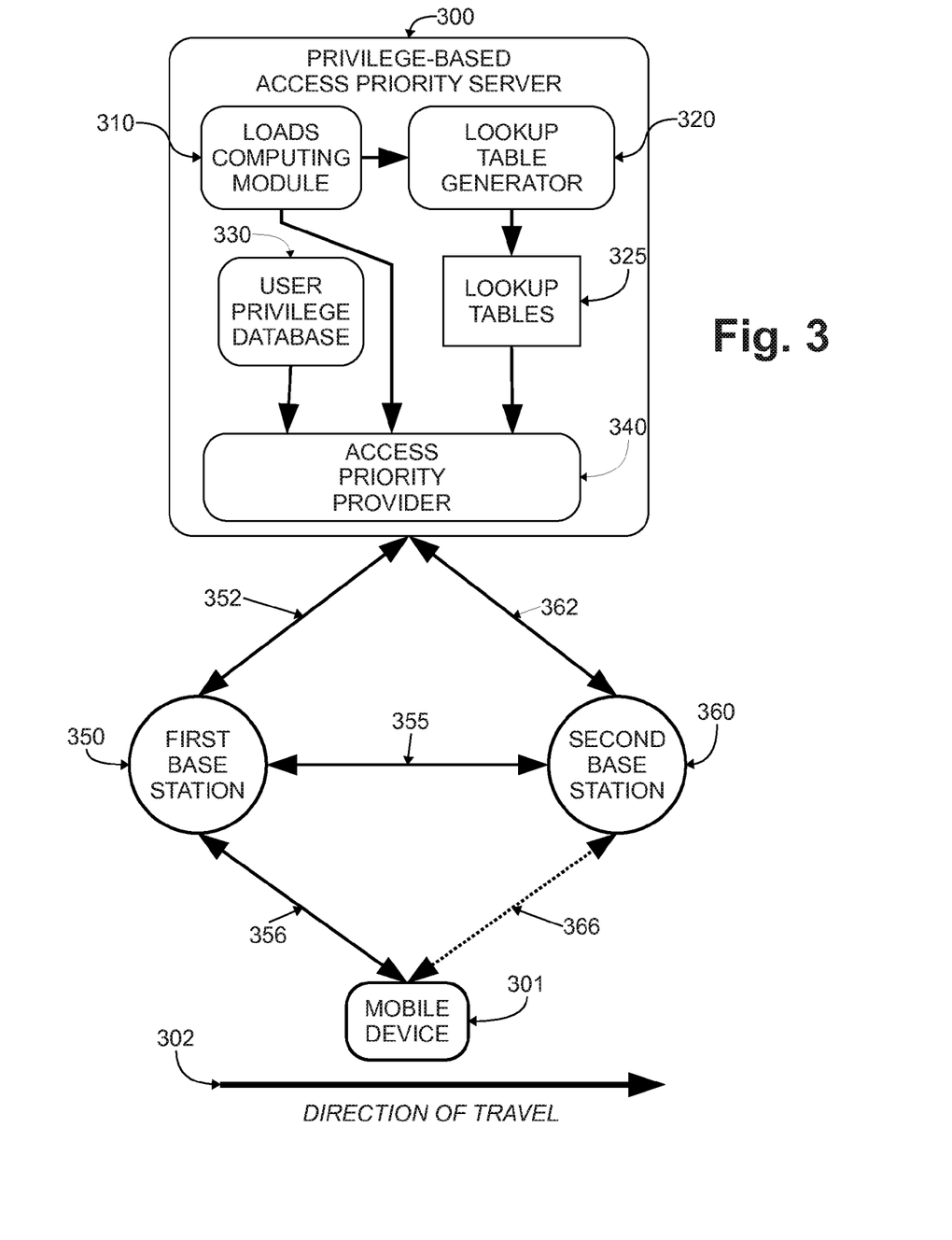
FIG. 3 is a block diagram representing modules that carry out the provision of privileged-based priority access in accordance with an embodiment of the invention.

FIG. 3 is a block diagram representing modules that carry out the provision of privilege-based priority access in accordance with an embodiment of the invention. A telecommunication system may utilize a server (e.g., 300) that implements the capabilities provided by the invention. Blocks 310, 320, 330, 325 and 340 represent modules that may be implemented in an electronic circuit board and/or one or more software programs that may run on one or more computers. The modules may be combined within the same physical machine or distributed across multiple machines, such as a cluster of servers, which may be spread over a network.

Block 310 represents one or more modules that obtain load data. Load data may be obtained through the logging of real time requests and/or analysis of historical data in order to anticipate network traffic and/or simulated data. Block 320 represents a module that implements the mathematical expression for generating the blocking probability lookup tables. The latter modules may also generate simulated data. Block 325 represents lookup tables that allow the system to anticipate network traffic in order to adjust priority level based on network conditions and user priority class level. Block 330 represents a database of user privileges. As described above, a network access provider that implements the invention (i.e., mufti-level privilege-based access) to the network may offer users the possibility to choose a privilege level, for example, for a set fee. The latter information may be used by the system in real time in order to determine the priority level that may be attributed to a user during a relay of a call from one base station (e.g., 350) to another base station (e.g., 360) and/or a request for a new connection.

Block 340 represents a module that accesses user privilege class data, load-based traffic data and any other information that may be pertinent to allow privilege-based access to users in order to enable base stations to allow or deny access to a given user.

Examples of using a server for providing user privilege-based access are given in the following. A user within the area of coverage of a first base station may request a new communication connection (e.g., 356). The first base station may request from the privilege-based server the class level of the user to determine whether, based on traffic condition, the user is to be allowed to connect to the network. Connections 356 represents the pool of channels that may be reserved in a given sector for the purpose of connecting user of a given privilege level.

In another example, a user (e.g., 301) may be moving in a direction (e.g., 302), which results in the weakening of signal 356 between the mobile device 301 and a first base station 350. The first base station may communicate with the second base station (e.g., through connection 355) in order to relay the signal to the second base station. In the latter example, the second base station may also request the status of the privilege class of the user (e.g., through connection 362) from the server 300 in order to determine whether the user is to be served from the second base station. If the latter is permitted, the mobile device is then connected (e.g., through connection 366) to the second base station.

Thus, a method and system for allowing access to a telecommunication network using privileges based on access privilege class has been presented. The invention utilizes existing data that characterize the network, such as current load, expected traffic as well user's access level in order to determine the priority of the particular user to connect to the network.

The claimed invention is:

1. A method for optimizing use of available channels of a wireless network comprising the steps of:
   determining a grade of service in handling a plurality of calls at a cell sector of a given coverage area;
   establishing a fraction of expected handoff calls, from a total calling rate in said cell sector;
   establishing an expected portion of priority access of said total calling rate, wherein said expected portion is greater than said fraction of expected Handoff calls;
   establishing a total number of channels to service a mobile terminal covered by said cell sector;
   establishing a number of channels to be exclusively dedicated to handling voice call transfer requests from said mobile terminal in a high traffic condition;
   establishing a number of channels to be exclusively dedicated to handling voice calls with an access privilege to said mobile terminal covered by said cell sector in said high traffic condition;
   determining a plurality of grade of service performance lookup tables;
   selecting at least one performance lookup table that establishes a plurality of blocking probabilities for said grade of service and values of said fraction of expected handoff calls and portion of priority access;
   selecting a number of channels from which a set of non-handover calls is to be blocked, starting from the desired grade of service performance; and
   selecting a number of channels from which a call without access privileges is to be blocked, based on said plurality of blocking probabilities.

2. The method of claim 1, wherein said step of determining said grade of service further comprises determining said grade of service without access privileges.

3. The method of claim 1, wherein said step of determining said grade of service further comprises determining said grade of service while using access privileges.

4. The method of claim 1, wherein said step of determining said grade of service further comprises determining said grade of service while considering Handoff calls.

5. The method of claim 1, wherein said step of determining said plurality of grade of service performance lookup tables further comprises considering a total number of channels available, a number of channels to be dedicated to handling calls with access priorities, a traffic load offered to the number of channels, and said blocking probabilities.

6. The method of claim 5, wherein said determining said plurality of grade of service quality performance lookup tables, further comprising calculating said lookup tables utilizing the values obtained from at least one model based on row theory, and further comprising:
   determining a portion of voice calls expected from each class of service access;
   determining a total number of voice channels available to offer voice service in a cell sector;
   determining a portion of those channels reserved to handle requests with some type of privilege; and
   determining a total traffic or load.

7. The method of claim 1, wherein said determining said plurality of grade of service performance lookup tables is obtained from theoretical models based on queuing theory, further comprising the steps of:
   obtaining a portion of voice calls expected from each access grade of service;
   obtaining a total number of voice channels available to offer voice service in a cell sector;
   obtaining a portion of a set of channels reserved to handle requests with a selected type of privilege; and
   obtaining a load.

8. The method of claim 7, wherein said determining said plurality of grade of service quality performance lookup tables, further comprises calculating said lookup tables utilizing the values obtained from simulations of the appearance of random calls of random durations, wherein some calls from preferred clients are handled by separate computing machine, further comprising:
   determining a portion of voice calls expected from each class of service access;
   determining a total number of voice channels available to offer voice service in a cell sector;
   determining a portion of a set of channels reserved to handle requests with a given type of privilege; and
   determining a total load.

9. The method of claim 1, wherein said determining said plurality of grade of service performance lookup tables further comprising simulating random calls having random durations made to a server system having a plurality of machine, wherein a subset of machines handle only calls from preferential clients, further comprising:
   determining a portion of voice calls expected from each class of access service;
   determining a portion of a channels reserved to handle requests with a selected type of privilege; and
   determining said load.

10. A system for telecommunication having wired and wireless means for connecting calls over wide areas using a plurality of base stations, said system comprising at least one computer server for providing optimization of available channels of a wireless network, a computer server having means for computing data, storing said data and serving said data to said base stations, said system comprising:
   means to determine a grade of service in handling a plurality of calls at a cell sector;
   means for establishing a fraction of expected handoff calls, from a total calling rate in said cell sector;
   means for establishing an expected portion of priority access of said total calling rate, wherein said expected portion is greater than said fraction of expected handoff calls;
   means for establishing a total number of channels to service a mobile terminal covered by said cell sector;
   means for establishing a number of channels to be exclusively dedicated to handling voice call transfer requests from said mobile terminal in a high traffic condition;

means for establishing a number of channels to be exclusively dedicated to handling voice calls with an access privilege to said mobile terminal covered by said cell sector in said high traffic condition;

means for determining a plurality of grade of service performance lookup tables;

means for selecting at least one performance lookup table that establishes a plurality of blocking probabilities for said grade of service and values of said fraction of expected handoff calls and portion of priority access;

means for selecting a number of channels from which a set of non-handover calls is to be blocked, starting from the desired grade of service performance; and means for selecting a number of channels from which a call without access privileges is to be blocked, based on said plurality of blocking probabilities.

11. The system of claim 10 further comprises means for determining said grade of service without access privileges.

12. The system of claim 10 further comprises means for determining said grade of service while using access privileges.

13. The system of claim 10 further comprises means for determining said grade of service while considering Handoff calls.

14. The system of claim 10 further comprises means for considering a total number of channels available, a number of channels to be dedicated to handling calls with access priorities, a traffic load offered to the number of channels, and said blocking probabilities.

15. The system of claim 14 further comprising means for calculating said lookup tables utilizing the values obtained from at least one model based on queuing theory, and further comprising:

means for determining a portion of voice calls expected from each class of service access;

means for determining a total number of voice channels available to offer voice service in a cell sector;

means for determining a portion of those channels reserved to handle requests with some type of privilege; and means for determining a total traffic or load.

16. The system of claim 10 further means for using at least one model based on row theory, further comprising:

means for obtaining a portion of voice calls expected from each access grade of service;

means for obtaining a total number of voice channels available to offer voice service in a cell sector;

means for obtaining a portion of a set of channels reserved to handle requests with a selected type of privilege; and means for obtaining a load.

17. The system of claim 16 further comprises means for calculating said lookup tables utilizing the values obtained from simulations of the appearance of random calls of random durations, wherein some calls from preferred clients are handled by separate computing machines, further comprising:

means for determining a portion of voice calls expected from each class of service access;

means for determining a total number of voice channels available to offer voice service in a cell sector;

means for determining a portion of a set of channels reserved to handle requests with a given type of privilege; and means for determining a total load.

18. The system of claim 10 further comprises means for simulating random calls having random durations made to a server system having a plurality of machines, wherein a subset of machines handles only calls from preferential clients, and further comprising:

means for determining a portion of voice calls expected from each class of access service;

means for determining a portion of a channels reserved to handle requests with a selected type of privilege; and means for determining said load.

* * * * *